United States Patent
Papolu et al.

(10) Patent No.: US 11,314,382 B2
(45) Date of Patent: Apr. 26, 2022

(54) SYSTEM, METHOD AND USER INTERFACE FOR DETERMINING AN EMPLOYEE'S LABOR COST RATE

(71) Applicant: Intuit Inc., Mountain View, CA (US)

(72) Inventors: Smitha Prasad Papolu, Mountain View, CA (US); Pawandeep Singh, Mountain View, CA (US); Paulina Zeng, Mountain View, CA (US); Kelly Lawson, Edmonton (CA)

(73) Assignee: Intuit Inc., Mountain View, CA (US)

( * ) Notice: Subject to any disclaimer, the term of this patent is extended or adjusted under 35 U.S.C. 154(b) by 50 days.

(21) Appl. No.: 16/774,033

(22) Filed: Jan. 28, 2020

(65) Prior Publication Data
US 2021/0232272 A1    Jul. 29, 2021

(51) Int. Cl.
*G06F 3/0482* (2013.01)
*G06Q 40/00* (2012.01)
*G06F 3/0481* (2013.01)
*G06F 3/04817* (2022.01)

(52) U.S. Cl.
CPC ........ *G06F 3/0482* (2013.01); *G06F 3/04817* (2013.01); *G06Q 40/123* (2013.12); *G06Q 40/125* (2013.12); *G06F 2203/04803* (2013.01)

(58) Field of Classification Search
CPC ............... G06F 3/0482; G06F 3/04817; G06F 2203/04803; G06Q 40/123; G06Q 40/125
See application file for complete search history.

(56) References Cited

U.S. PATENT DOCUMENTS

| | | | | |
|---|---|---|---|---|
| 5,995,984 | A * | 11/1999 | Lau | G06F 3/0481 345/661 |
| 6,256,649 | B1* | 7/2001 | Mackinlay | G06F 40/18 715/212 |
| 2006/0064393 | A1* | 3/2006 | Orr | G06Q 30/0283 705/400 |
| 2006/0111953 | A1* | 5/2006 | Setya | G06Q 10/10 705/7.26 |
| 2007/0192163 | A1* | 8/2007 | Barr | G06Q 30/0203 705/7.32 |
| 2007/0276742 | A1* | 11/2007 | Zalta | G06Q 40/00 705/30 |
| 2007/0276743 | A1* | 11/2007 | Zalta | G06Q 40/123 705/34 |
| 2008/0059900 | A1* | 3/2008 | Murray | G06F 9/453 |
| 2009/0210331 | A1* | 8/2009 | Boone | G06Q 40/125 705/32 |
| 2010/0121685 | A1* | 5/2010 | Mahadevan | G06Q 10/06393 705/7.39 |
| 2010/0122218 | A1* | 5/2010 | Mahadevan | G06Q 10/06 715/853 |
| 2010/0198634 | A1* | 8/2010 | Hayden | G06Q 10/1091 705/36 R |
| 2012/0036474 | A1* | 2/2012 | Achtermann | G06F 16/26 715/810 |
| 2014/0214637 | A1* | 7/2014 | Pai | G06Q 40/123 705/31 |

(Continued)

*Primary Examiner* — Ariel Mercado
*Assistant Examiner* — Phoebe X Pan
(74) *Attorney, Agent, or Firm* — DLA Piper LLP (US)

(57) ABSTRACT

Systems, methods and a graphical user interface for determining an employee's real-time labor cost, which may be based on the employee's wages and other employer costs that add to the cost of using an employee for a particular project.

17 Claims, 9 Drawing Sheets

(56) References Cited

U.S. PATENT DOCUMENTS

2016/0224205 A1\* 8/2016 Fulton ................ G06Q 10/1057
2016/0328799 A1\* 11/2016 Edwards ............ G06Q 10/1057
2021/0357865 A1\* 11/2021 Bulumulla ............. G06Q 50/26

\* cited by examiner

SYSTEM, METHOD AND USER INTERFACE FOR DETERMINING AN EMPLOYEE'S LABOR COST RATE

DETAILED DESCRIPTION OF SEVERAL EMBODIMENTS

Embodiments described herein may be configured to determine and display an employee's real-time labor cost value using a novel computer-human interface, which may implement an interactive cost calculator that may utilize e.g., the employee's wage rate and other employer costs that typically add to the expense of using an employee for a particular project. In one or more embodiments, the disclosed principles may activate the cost calculator to determine the employee's labor cost value based on, among other things, the employee's wage data from a payroll source and employer cost data associated with e.g., employer taxes, insurance and overhead. With this real-time labor cost value, a user of the disclosed system may be better able to evaluate profit margins when one or more employees are used for a particular project. Significantly, the layout and content of the disclosed user interface and cost calculator provide the user with the ability to interact with and derive the desired labor cost value from a single screen.

Figure 1A:
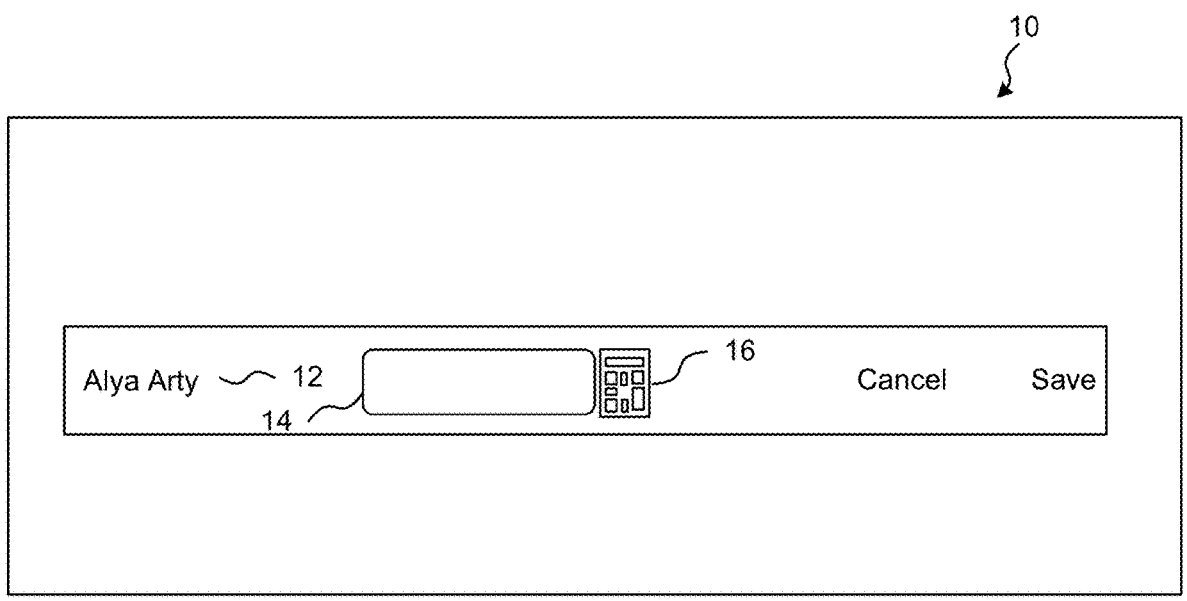
FIG. 1a shows an example user interface comprising a calculator icon arrangement in accordance with the disclosed principles.
Figure 1B:
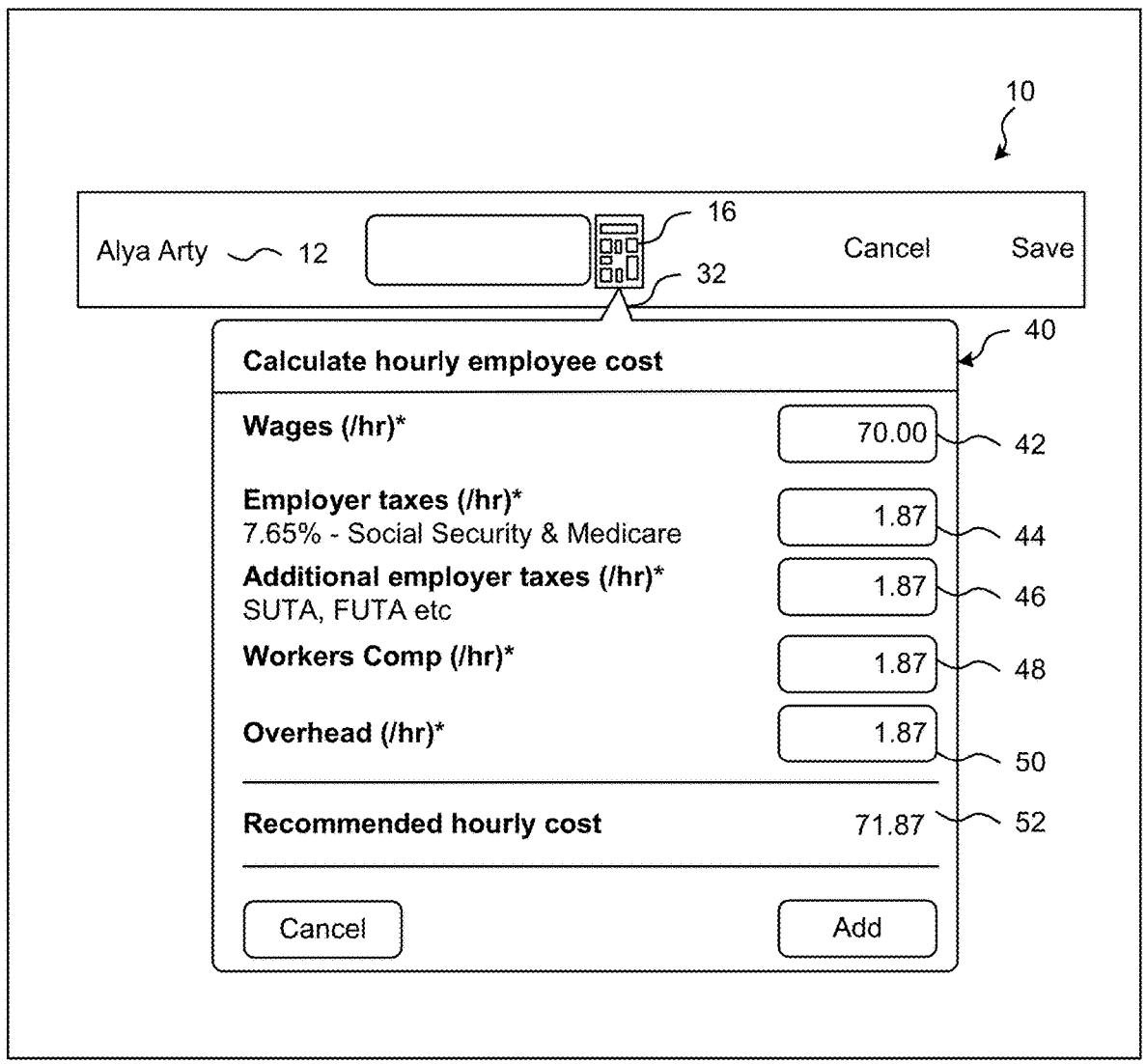
FIG. 1b shows an example user interface that may be presented when the calculator icon is selected and being proximate to the user interface comprising the calculator icon arrangement in accordance with the disclosed principles.

For example, as shown in the user interface 10 of FIG. 1a, a cost calculator selectable icon 16 may be provided adjacent a field 14 that may be populated with the cost rate information of an employee identified by field 12. As shown in FIG. 1b, upon selection of the calculator selectable icon 16, a second user interface 40 is presented proximate to the first user interface 10. A graphical symbol 32 may be used to show that the second user interface 40 stemmed from, originated from and or popped out of the calculator icon 16. The second user interface 40 may contain fields 42, 44, 46, 48, 50, 52 for inputting, outputting or displaying the employee's wages, employer costs associated with each employee such as FICA (Federal Insurance Contributions Act) taxes (e.g., social security and Medicare taxes), federal and state unemployment taxes, workers compensation insurance, the business' operating overhead and a recommended hourly cost rate derived in accordance with the disclosed principles. While the present disclosure illustrates embodiments where the labor cost value is an hourly rate, it should be appreciated that the disclosed principles are not so limited and can apply to other values suitable for determining an employee's true cost for a project.

The disclosed principles may address problems businesses encounter every day. For example, many project-based businesses find themselves lost when it comes to knowing if their projects are actually profitable or not. This may directly translate to the business losing money due to its underpricing/underbidding of projects and or having employees spend too much time on projects. Indeed, many businesses around the world continue to lose money because there is no easy way for them to calculate the true cost of their employees. For example, in the few instances where an employer or business owner currently attempts to incorporate hidden employee costs into its profit margin or other analysis, these employers/business owners do so using spreadsheets. To do so, the employer/business owner must determine formulas and input them into cells of the spreadsheet. Moreover, data entry cells needed for the formulas are not associated with graphical icons such as the disclosed cost calculator selectable icon 16. Furthermore, the spreadsheet technique does not provide all of the information in a single screen. Thus, current employers/business owners may need to switch between pages/tabs of the spreadsheet program and or may need to scroll through several screens to execute and or view the calculations—this is undesirable.

The disclosed systems and methods may overcome these deficiencies by providing a novel computer-human interface for inputting information required to determine an employee's real-time labor cost value. In one or more embodiments, the value is a rate such as e.g., an hourly labor cost rate or labor cost per hour. In one or more embodiments, as shown in FIGS. 1a and 1b, the disclosed user interfaces 10, 40 may implement an interactive cost calculator 40 that may be accessed by a user using a calculator icon 16 to initiate the process for determining the employee's real-time labor cost. In one or more embodiments, for each employee that is added to the system, the disclosed principles may input an employee's hourly wage rate (e.g., via field 42) and may use that rate to automatically determine a FICA tax rate (e.g., field 44). The disclosed principles may also input hourly rate information associated with additional employer taxes such as e.g., SUTA (State Unemployment Tax Authority) and FUTA (Federal Unemployment Tax Act) taxes (e.g., via field 46), workers compensation insurance (e.g., field 48), and overhead expenses (e.g., field 50). The employee's real-time labor cost rate may be determined by adding all these rates together, providing a final true cost for each employee that may then be used for project bidding, profit margin assessment and other planning. The real-time labor cost rate may be displayed as an output of the cost calculator (e.g., field 52). As noted above, the disclosed principles are not limited to labor cost rates and can apply to other values suitable for determining an employee's true cost for a project.

An example computer-implemented method comprises outputting a first graphical user interface to a display of a computing device, the first graphical user interface comprising: a first field identifying an employee, a second field for selecting a cost calculator process for the employee identified in the first field, and a third field for displaying a calculated labor cost value for the employee identified in the first field. The method further comprises receiving an input of a selection of the second field; outputting a second graphical user interface to the display in response to inputting the selection of the second field, the second graphical user interface being provided proximate to the first user interface and in a same screen view of the display, the second user interface comprising: a first region for displaying a wage value for the employee, a second region for displaying at least one employer cost value attributable to employee, and a third region for displaying the calculated labor cost value for the employee. The method further comprises receiving an input to the wage value; receiving an input to the at least one employer cost value; and determining the calculated labor cost value based on the wage value and the at least one employer cost.

Figure 2:
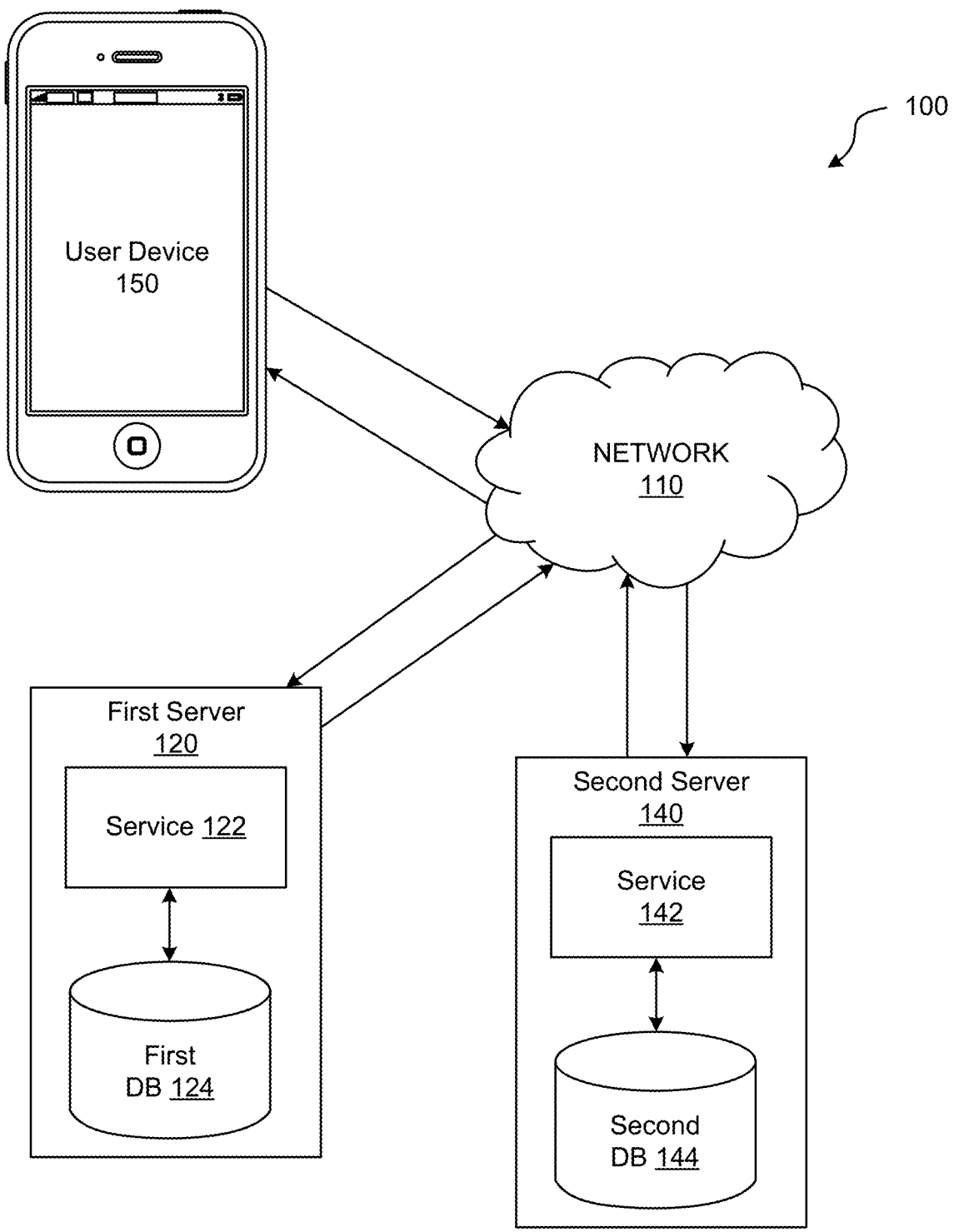
FIG. 2 shows an example of a system configured to determine and display an employee's real-time labor cost value using a novel computer-human interface according to an embodiment of the present disclosure.

FIG. 2 shows an example of a system 100 configured to determine and display an employee's real-time labor cost value (e.g., rate) using a novel computer-human interface according to an embodiment of the present disclosure. System 100 may include first server 120, second server 140, and/or user device 150. Network 110 may be the Internet and/or other public or private networks or combinations thereof. First server 120, second server 140, and/or user device 150 may be configured to communicate with one another through network 110. For example, communication between the elements may be facilitated by one or more application programming interfaces (APIs). APIs of system 100 may be proprietary and/or may be examples available to those of ordinary skill in the art such as Amazon® Web Services (AWS) APIs or the like.

First server 120 may be configured to input payroll data (e.g., an employee's yearly, monthly, weekly, daily or hourly wage amount) and employer cost data and perform a method of determining an employee's labor cost value using a novel computer-human interface as described herein. First server 120 may include a first service 122, which may be configured to collect and process the data, and a first database 124, which may be configured to store the collected data and/or the outcome of the processing performed by the first service 122. Detailed examples of the data gathered, processing performed, and the results generated are provided below.

First server 120 may gather the data from second server 140 and/or user device 150. For example, second server 140 may include second service 142, which may maintain e.g., payroll data associated with one or more employees or contractors associated with the user's business in second database 144 and transmit the data to first server 120. First service 142 may be any network 110 accessible service that may be used to implement accounting and other services to input and organize projects, input employee and employer data and payroll information, and determine labor and or other costs associated with employees and or a project. A non-limiting example set of first service 142 may include QuickBooks®, QuickBooks Self-Employed®, QuickBooks Online®, QuickBooks Online® Plus, QuickBooks Online® Advanced, other services, or combinations thereof. Detailed examples of the data gathered from first service 142 are provided below.

User device 150 may be any device configured to present user interfaces and receive inputs thereto. For example, user device 150 may be a smartphone, personal computer, tablet, laptop computer, or other device.

First server 120, second server 140, and user device 150 are each depicted as single devices for ease of illustration, but those of ordinary skill in the art will appreciate that first server 120, second server 140, and/or user device 150 may be embodied in different forms for different implementations. For example, any or each of first server 120 and second server 140 may include a plurality of servers. Alternatively, the operations performed by any or each of first server 120 and second server 140 may be performed on fewer (e.g., one or two) servers. In another example, a plurality of user devices 150 may communicate with first server 120 and/or second server 140. A single user may have multiple user devices 150, and/or there may be multiple users each having their own user device(s) 150.

Figure 3:
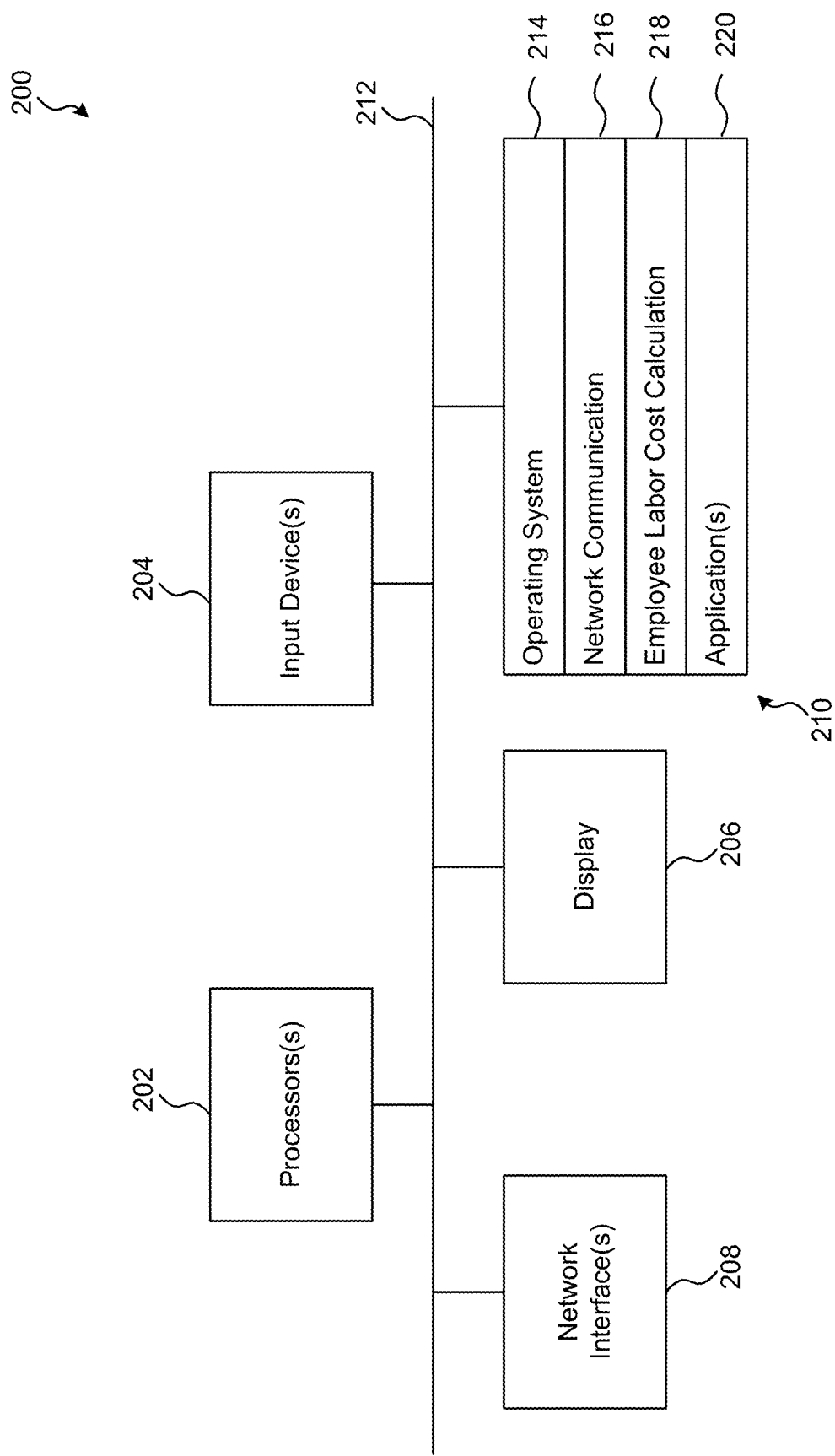
FIG. 3 shows a server device according to an embodiment of the present disclosure.

FIG. 3 is a block diagram of an example computing device 200 that may implement various features and processes as described herein. For example, computing device 200 may function as first server 120, second server 140, or a portion or combination thereof in some embodiments. The computing device 200 may be implemented on any electronic device that runs software applications derived from compiled instructions, including without limitation personal computers, servers, smart phones, media players, electronic tablets, game consoles, email devices, etc. In some implementations, the computing device 200 may include one or more processors 202, one or more input devices 204, one or more display devices 206, one or more network interfaces 208, and one or more computer-readable media 210. Each of these components may be coupled by a bus 212.

Display device 206 may be any known display technology, including but not limited to display devices using Liquid Crystal Display (LCD) or Light Emitting Diode (LED) technology. Processor(s) 202 may use any known processor technology, including but not limited to graphics processors and multi-core processors. Input device 204 may be any known input device technology, including but not limited to a keyboard (including a virtual keyboard), mouse, track ball, and touch-sensitive pad or display. Bus 212 may be any known internal or external bus technology, including but not limited to ISA, EISA, PCI, PCI Express, NuBus, USB, Serial ATA or FireWire. Computer-readable medium 210 may be any medium that participates in providing instructions to processor(s) 202 for execution, including without limitation, non-volatile storage media (e.g., optical disks, magnetic disks, flash drives, etc.), or volatile media (e.g., SDRAM, ROM, etc.).

Computer-readable medium 210 may include various instructions 214 for implementing an operating system (e.g., Mac OS®, Windows®, Linux). The operating system may be multi-user, multiprocessing, multitasking, multithreading, real-time, and the like. The operating system may perform basic tasks, including but not limited to: recognizing input from input device 204; sending output to display device 206; keeping track of files and directories on computer-readable medium 210; controlling peripheral devices (e.g., disk drives, printers, etc.) which can be controlled directly or through an I/O controller; and managing traffic on bus 212. Network communications instructions 216 may establish and maintain network connections (e.g., software for implementing communication protocols, such as TCP/IP, HTTP, Ethernet, telephony, etc.).

Employee labor cost calculation instructions 218 may include instructions that implement the computer-human interface disclosed herein, input payroll data (e.g., an employee's hourly wage rate) and employer cost data, and perform a method of determining an employee's labor cost rate as described herein.

Application(s) 220 may be an application that uses or implements the processes described herein and/or other processes. The processes may also be implemented in operating system 214.

The described features may be implemented in one or more computer programs that may be executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program may be written in any form of programming language (e.g., Objective-C, Java), including compiled or interpreted languages, and it may be deployed in any form, including as a stand-alone program or as a module, component, subroutine, or other unit suitable for use in a computing environment.

Suitable processors for the execution of a program of instructions may include, by way of example, both general and special purpose microprocessors, and the sole processor or one of multiple processors or cores, of any kind of computer. Generally, a processor may receive instructions and data from a read-only memory or a random access memory or both. The essential elements of a computer may include a processor for executing instructions and one or more memories for storing instructions and data. Generally, a computer may also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data may include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

To provide for interaction with a user, the features may be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features may be implemented in a computer system that includes a back-end component, such as a data server, or that includes a middleware component, such as an application server or an Internet server, or that includes a front-end component, such as a client computer having a graphical user interface or an Internet browser, or any combination thereof. The components of the system may be connected by any form or medium of digital data communication such as a communication network. Examples of communication networks include, e.g., a telephone network, a LAN, a WAN, and the computers and networks forming the Internet.

The computer system may include clients and servers. A client and server may generally be remote from each other and may typically interact through a network. The relationship of client and server may arise by virtue of computer programs running on the respective computers and having a client-server relationship to each other.

One or more features or steps of the disclosed embodiments may be implemented using an API. An API may define one or more parameters that are passed between a calling application and other software code (e.g., an operating system, library routine, function) that provides a service, that provides data, or that performs an operation or a computation.

The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API.

In some implementations, an API call may report to an application the capabilities of a device running the application, such as input capability, output capability, processing capability, power capability, communications capability, etc.

Figure 4:
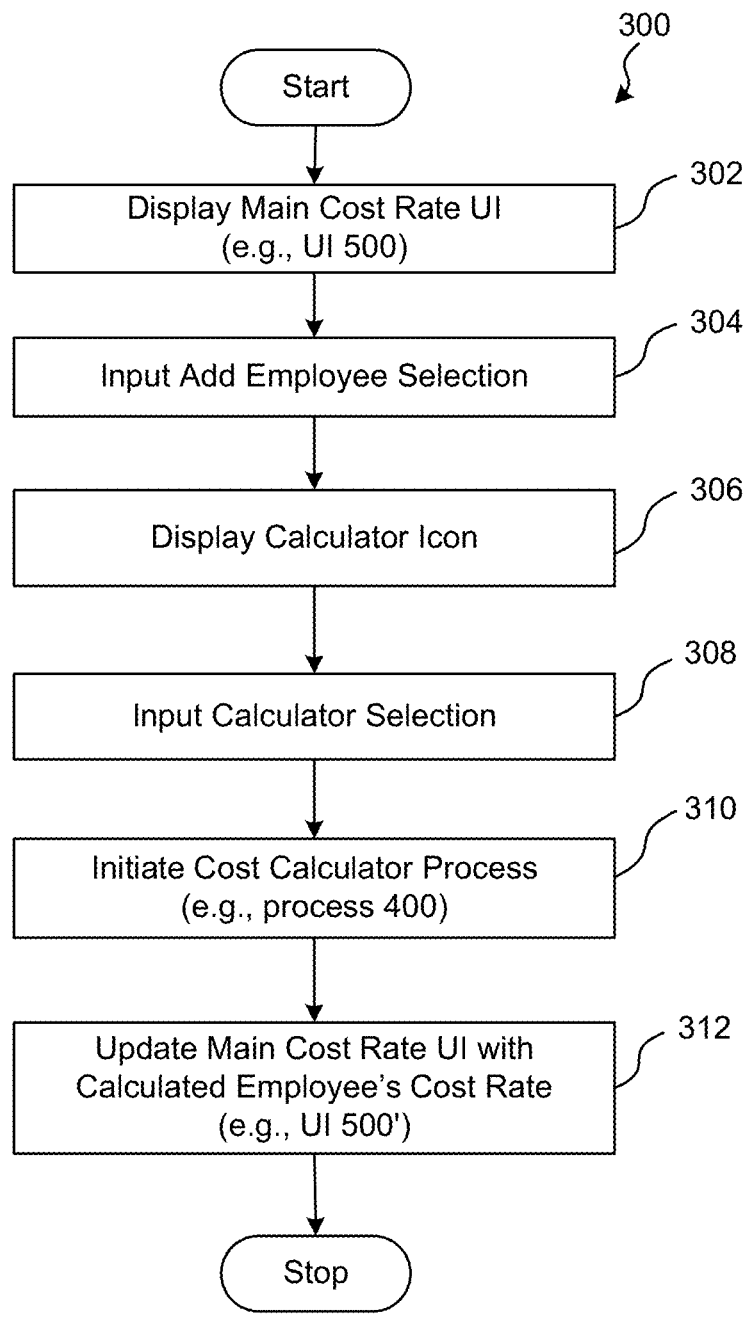
FIG. 4 shows an example process for determining an employee's labor cost value according to an embodiment of the present disclosure.

FIG. 4 illustrates an example process 300 for determining an employee's labor cost value according to an embodiment of the present disclosure. System 100 may perform some or all of these processes illustrated in FIG. 3. Hereinafter, the disclosed principles are described as determining a labor cost rate. It should be appreciated, however, that the disclosed principles are not limited to labor cost rates and can apply to other values suitable for determining an employee's true cost for a project. In one embodiment, at step 302, the process 300 may display a main cost rate user interface on a display such as e.g., display 206 (FIG. 3) or a display of the user device 150. In one or more embodiments, the main cost rate user interface may be initiated as part of a projects function of an accounting service such as the ones described above. In one embodiment, the main cost rate user interface may be a standalone feature of accounting service, payroll service or other business application or service.

In one embodiment, the main cost rate user interface displayed at step 302 may be implemented as the main cost rate user interface 500 illustrated in FIG. 6 (discussed below in more detail). The process 300 at step 304 may input an "add employee" selection. At step 306, the process 300 may display the cost calculator selectable icon in the row of the added employee. At step 308, the process 300 may input a selection of the cost calculator selectable icon and, in response, the process 300 at step 310 may initiate a cost calculator process such as the process 400 illustrated in FIG. 5 (discussed below). Upon the completion of the cost calculator process 400, the process 300 at step 312 may update the main cost rate user interface as shown for example as updated main cost rate user interface 500' in FIG. 8 (discussed below).

Figure 5:
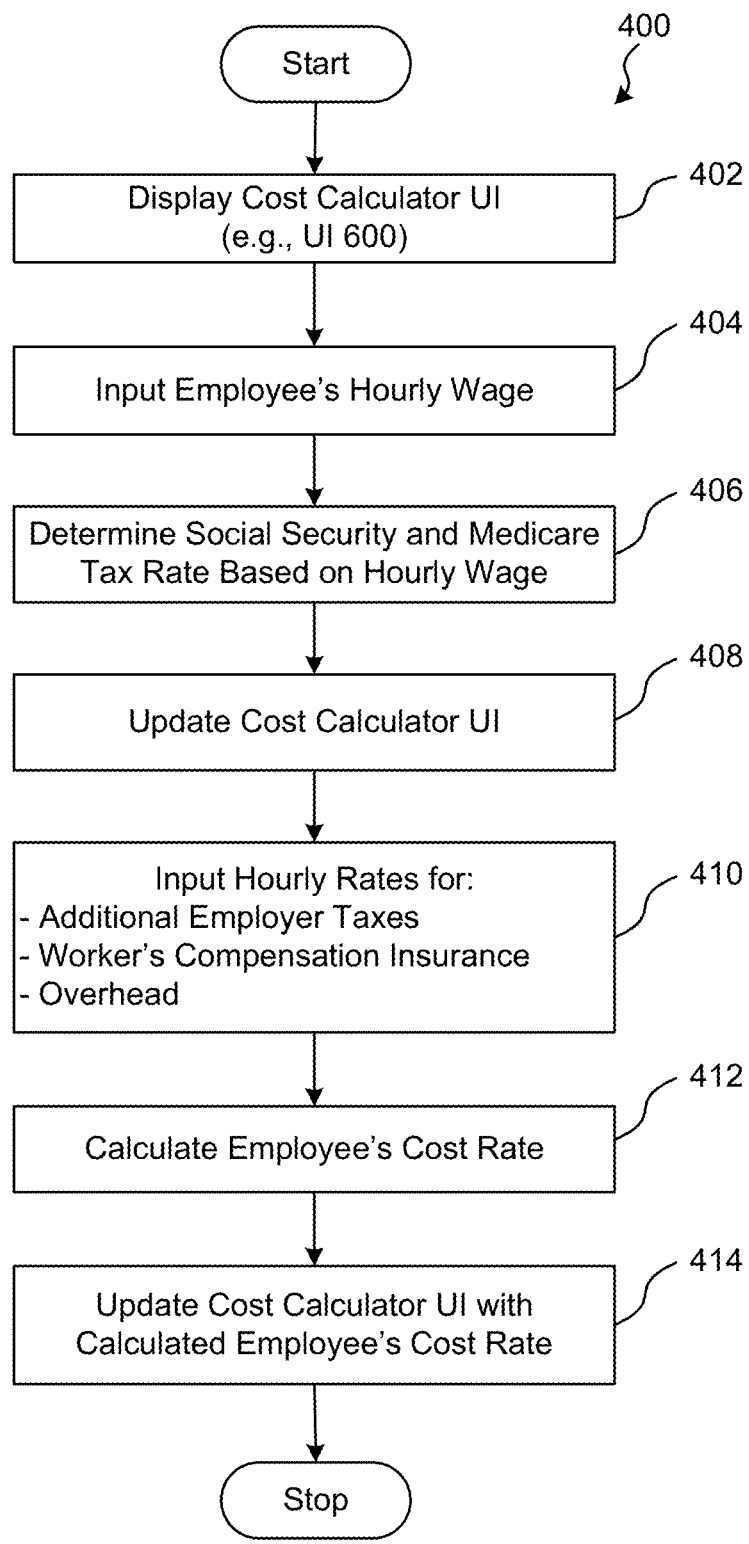
FIG. 5 shows an example cost calculator process that may be used in the process for determining an employee's labor cost value according to an embodiment of the present disclosure.
Figure 6:
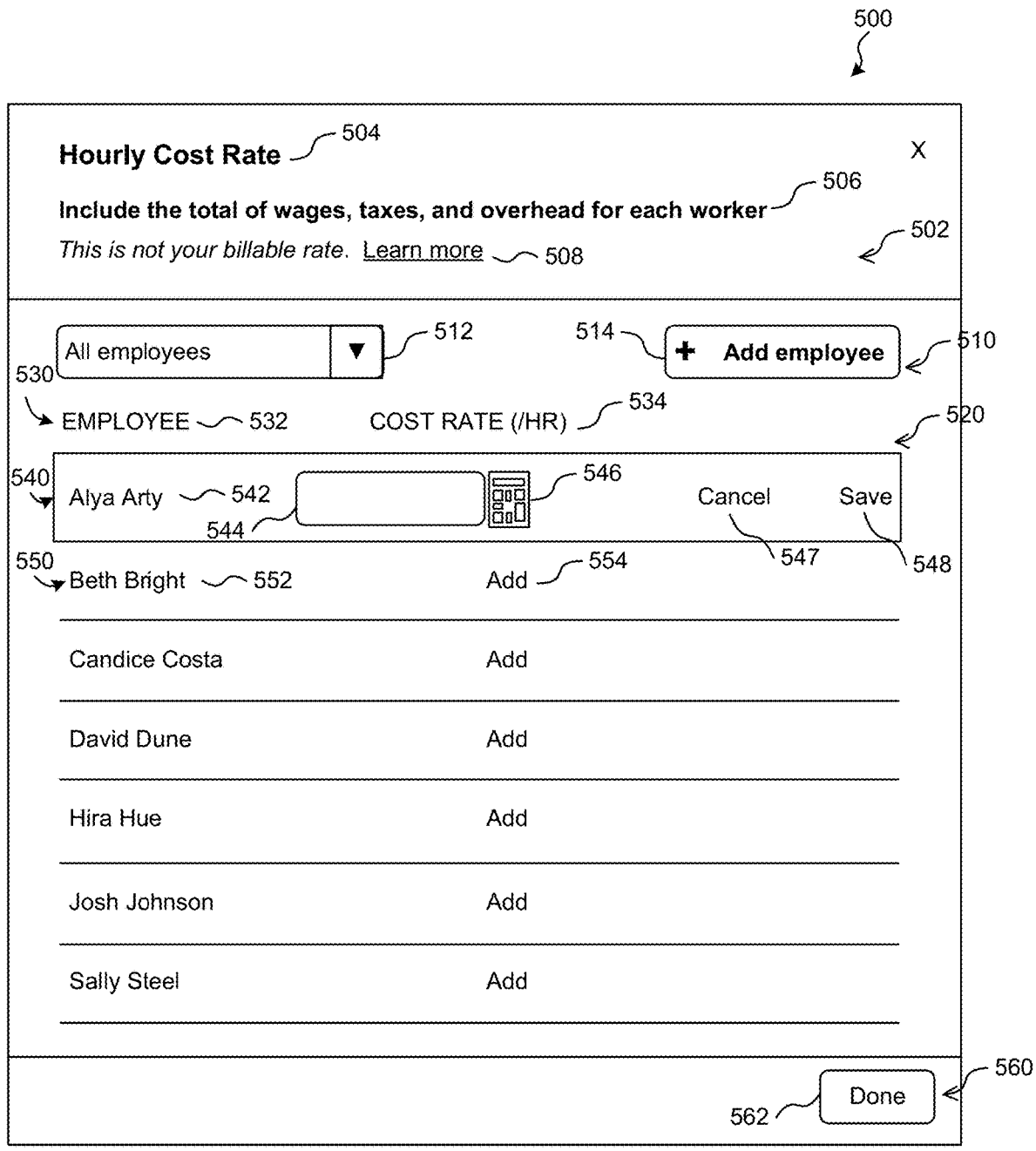
FIG. 6 shows an example user interface that may be used in the process for determining an employee's labor cost value according to an embodiment of the present disclosure.

With reference to FIG. 5, the cost calculator process 400 may begin at step 402 by displaying an hourly cost calculator interface such as the interface 600 of FIG. 6. As will be described in more detail below, the hourly cost calculator interface provides an interactive interface for inputting the information required to determine the selected employee's labor cost rate in accordance with the disclosed principles. At step 404, the process 400 may input the selected employee's hourly wage rate. In one or more embodiments, payroll data (e.g., an employee's hourly wage rate) may be input automatically. It should be appreciated that automatic retrieval of payroll data would simplify the process 400 and ensure accuracy of the information input at step 404 by removing potential user error.

At step 406, the process 400 may input and or determine the required taxes related to e.g., the Social Security and Medicare taxes paid by the employer. In one embodiment, the process 400 may determine the employer taxes automatically as a percentage (e.g., 7.65%) of the selected employee's wages (from step 404) since the tax base and tax percentage may be known in advance. In one embodiment, the user may input or modify the employer taxes via a field within the user interface 600 (discussed below). In accordance with the disclosed principles, the process 400 at step 408 may update the hourly cost calculator interface by outputting an hourly employer tax rate on the interface.

The process 400 at step 410 may input the additional employer taxes such as e.g., SUTA (State Unemployment Tax Authority) and FUTA (Federal Unemployment Tax Act) taxes paid by the employer. The process 400 may input workers compensation insurance paid by the employer. In one or more embodiments, the workers compensation insurance amount may be based on a yearly workers compensation premium amount paid by the employer for its entire workforce. The process 400 may input the employer's overhead, which may be determined on a per project basis, on overall overhead of the employer's business, or any other suitable measure of expected overhead for the employee or employer in general. In one or more embodiments, overhead refers to all of the general "doing business costs" that are associated with running a business on a daily basis. These overhead costs could include rent, business insurance, accounting, billing, and office equipment. Overhead costs are a key component for making up the total cost to run a business, and are made up of ongoing costs that must be paid regardless of the company's current volume of business.

The process 400 at step 412 may calculate the employee's labor cost rate by adding up all of the information entered so far. For example, the employee's labor cost rate can be determined by adding together the rates of the wages, employer taxes, additional employer taxes, workers compensation insurance and overhead. In accordance with the disclosed principles, the process 400 at step 414 may update the hourly cost calculator interface by outputting the hourly cost rate.

Up to this point, example processes 300, 400 have been described. Example user interfaces used by the processes 300, 400 in accordance with the disclosed principles are now described.

FIG. 6 illustrates an example main cost rate user interface 500 that may be presented and used by process 300. The main cost rate user interface 500 may include a first region 502, second region 510, third region 520 and fourth region 560. In one embodiment, the first region 502 may serve as a title or header region of the main cost rate user interface 500 and may include a first field 504, second field 506 and a third field 508. In the illustrated example, the first field 504 contains the text "Hourly cost rate," identifying the general contents or function of the main cost rate user interface 500. In the illustrated example, the second field 506 contains a textual explanation (e.g., "Include the total of wages, taxes, and overhead for each worker") describing the contents or function of the main cost rate user interface 500. In the illustrated example, the third field 508 may include a user-actuatable link to "Learn more" about the main cost rate user interface 500. In one embodiment, this link may cause a frequently asked questions (FAQ) user interface to appear above or near the main cost rate user interface 500.

In one embodiment, the second region 510 may include a first menu 512 and a selection button 514, which in combination may allow a user to select an employee from the first menu 512 and add the selected employee to the main cost rate user interface 500 using the selection button 514.

In one or more embodiments, first menu 512 is a selectable drop down menu containing some or all of the employees that may be added to the interface 500. In accordance with the disclosed principles, the second region 510 may provide the user with the ability to list an employee in the third region 520, which may then allow the user to initiate the cost calculator (via selectable icon 546) to determine that employee's labor cost value (e.g., rate) as discussed further below.

In the illustrated example, the third region 520 contains a first row 530, which includes employee heading 532 containing the text "EMPLOYEE" and cost rate heading 534 containing the text "COST/RATE (/HR)." In the illustrated example, the third region 520 contains a second row 540 having text field 542, updateable field 544, cost calculator selectable icon 546, cancel selector 547 and save selector 548. In accordance with the disclosed principles, second row 540 illustrates the scenario whereby a user has added an employee (identified as "Alya Arty") to the third region 520 (e.g., via first menu 512 and selection button 514) and is given the tools (e.g., cost calculator selectable icon 546, cancel selector 547 and save selector 548) to calculate the labor cost rate for the added employee. In one embodiment, updateable field 544 may display a previously calculated labor cost rate. In one embodiment, the selection of the cost calculator selectable icon 546 will cause the process 300 to display an hourly cost calculator user interface (e.g., hourly cost calculator interface 600 of FIG. 6).

In the illustrated example, the third region 520 contains a third row 550 having text field 552 and add selector 554. In the illustrated example, the third row 550 illustrates the tool (e.g., add selector 554) the user selects to bring up the cost calculator selectable icon 546. That is, in accordance with the disclosed principles, when the user selects add selector 554, the contents of the row may change by replacing add selector 554 with the updateable field 544, cost calculator selectable icon 546, cancel selector 547 and save selector 548 as described above.

In the illustrated example, the fourth region 560 contains a done selector 562. In one embodiment, selection of the done selector 562 by the user indicates to the system that the user is done with the main cost rate user interface 500.

As noted above, the process 300 may input an "add employee" selection, which may occur after a user manipulates the first menu 512 (to select an employee from the menu) and actuates the selection button 514. In one embodiment, the employee is added to the third region 520. For example, in the illustrated example, it is presumed that the user selected the employee "Alya Arty" who is now listed in row 540 by text field 542 underneath the employee heading 532. Moreover, the process 300 may display the cost calculator selectable icon 546 in the row 540 of the added employee. In one embodiment, the cost calculator selectable icon 546 may be displayed in response to the selection of add selector 554.

Figure 7:
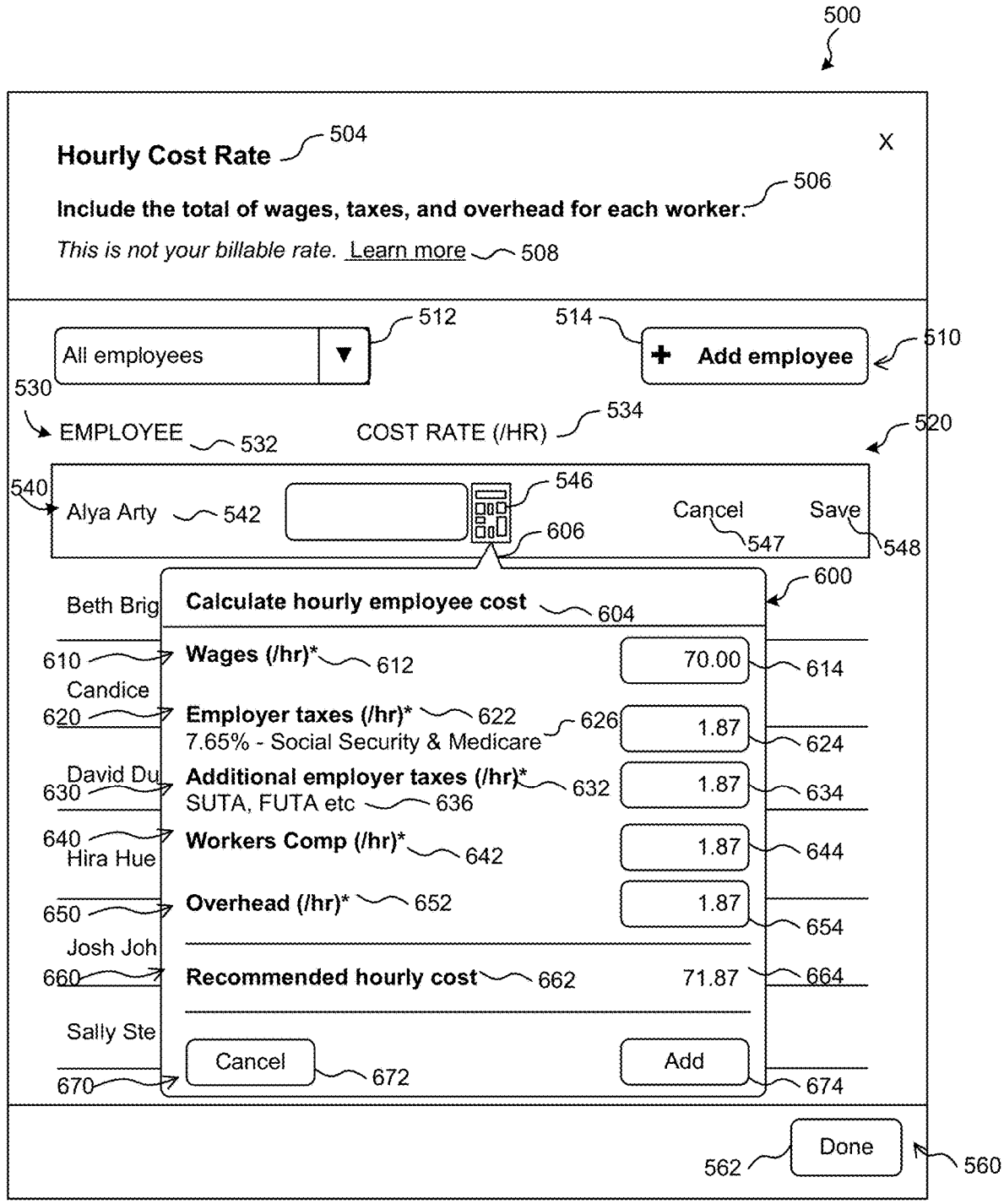
FIG. 7 shows an example user interface that may be used in the cost calculator process according to an embodiment of the present disclosure.

FIG. 7 illustrates an example hourly cost calculator interface 600 that may be presented and used during process 400. The hourly cost calculator interface 600 provides an interactive interface for inputting the information required to determine the selected employee's labor cost rate in accordance with the disclosed principles. In one embodiment, the hourly cost calculator interface 600 may include a title portion 602, which may contain a text field 604 containing the text "Calculate hourly employee cost," identifying the general contents or function of the hourly cost calculator interface 600.

In one embodiment, the hourly cost calculator interface 600 may be displayed proximate to and or over the main cost rate user interface 500 such that all interface elements needed to determine the true labor cost rate of the employee are on the same screen and without the user navigating away from the original interface 500. In one or more embodiments, the hourly cost calculator interface 600 may contain a graphical symbol 606 making it appear that the hourly cost calculator interface 600 originated from and or popped out of the cost calculator selectable icon 546. In one embodiment, the graphical symbol 606 is a pop-out symbol. In one embodiment, an animation may be used to present the hourly cost calculator interface 600 over the main cost rate user interface 500.

In the illustrated example, the hourly cost calculator interface 600 includes a first row 610 containing a text field 612 and an updatable field 614. In the illustrated example, the text field 612 identifies the row 610 and input field 614 with the text "Wages (/hr)*." In accordance with the disclosed principles, the first row 610 may be used by the process 400 to input the selected employee's hourly wage rate. In the illustrated embodiment, text field 612 uses the "*" symbol to indicate that the information is mandatory to determine the employee's labor cost rate. In one or more embodiments, payroll data (e.g., an employee's hourly wage rate) may be input automatically and used to populate field 614. In accordance with the disclosed principles, the process 400 may input an hourly rate via field 614.

In the illustrated example, the hourly cost calculator interface 600 includes a second row 620 containing a first text field 622, an updateable field 624, and a second text field 626. In the illustrated example, the first text field 622 identifies the row 620 and updateable field 624 with the text "Employer taxes (/hr)*" and the second text field 626 contains the description "7.65%—Social Security & Medicare," identifying what the "Employer taxes" are (e.g., FICA taxes). In accordance with the disclosed principles, the second row 620 may be used by the process 400 to input and or output the required taxes related to e.g., the Social Security and Medicare taxes paid by the employer. In one or more embodiments, the employer taxes are displayed in field 624 as an hourly rate. In one embodiment, the user may input or modify the employer taxes via updateable field 624. In the illustrated embodiment, first text field 622 uses the "*" symbol to indicate that the information is mandatory to determine the employee's labor cost rate. In accordance with the disclosed principles, the process 400 may update the hourly cost calculator interface 600 by outputting an hourly employer tax rate via updateable field 624.

In the illustrated example, the hourly cost calculator interface 600 includes a third row 630 containing a first text field 632, an input field 634, and a second text field 636. In the illustrated example, the first text field 632 identifies the row 630 and input field 634 with the text "Additional employer taxes (/hr)" and the second text field 636 contains the description "SUTA, FUTA, etc.," identifying what the "Additional employer taxes" are. In accordance with the disclosed principles, the third row 630 may be used by the process 400 to input the additional employer taxes such as e.g., SUTA (State Unemployment Tax Authority) and FUTA (Federal Unemployment Tax Act) taxes paid by the employer. In one or more embodiments, the additional employer taxes are input and displayed in field 634 as an hourly rate.

In the illustrated example, the hourly cost calculator interface 600 includes a fourth row 640 containing a text field 642 and an input field 644. In the illustrated example, the text field 642 identifies the row 640 and input field 644 with the text "Workers Comp (/hr)." In accordance with the disclosed principles, field 644 may be used by the process 400 to input workers compensation insurance paid by the employer. In one or more embodiments, the workers compensation insurance amount may be based on a yearly workers compensation premium amount paid by the employer for its entire workforce. In one or more embodiments, the workers compensation amount is input and displayed in field 644 as an hourly rate.

In the illustrated example, the hourly cost calculator interface 600 includes a fifth row 650 containing a text field 652 and an input field 654. In the illustrated example, the text field 652 identifies the row 650 and input field 654 with the text "Overhead (/hr)." In accordance with the disclosed principles, field 654 may be used by the process 400 to input the employer's overhead (discussed above). In one or more embodiments, the overhead amount is input and displayed in field 654 as an hourly rate.

In the illustrated example, the hourly cost calculator interface 600 includes a sixth row 660 containing a text field 662 and an output field 664. In the illustrated example, the text field 662 identifies the row 660 and output field 664 with the text "Recommended hourly cost." In accordance with the disclosed principles, the process 400 may update the hourly cost calculator interface 600 by outputting the hourly cost rate via updateable field 664.

In the illustrated example, the hourly cost calculator interface 600 includes a seventh row 670 containing a cancel selector 672 and a save selector 674. The cancel selector 672 may be used by the user to cancel the current cost calculator process 400. The save selector 674 may be used by the user to save the determined hourly labor cost rate, complete the cost calculator process 400 and return to step 312 of the process 300 for determining an employee's labor cost rate.

Figure 8:
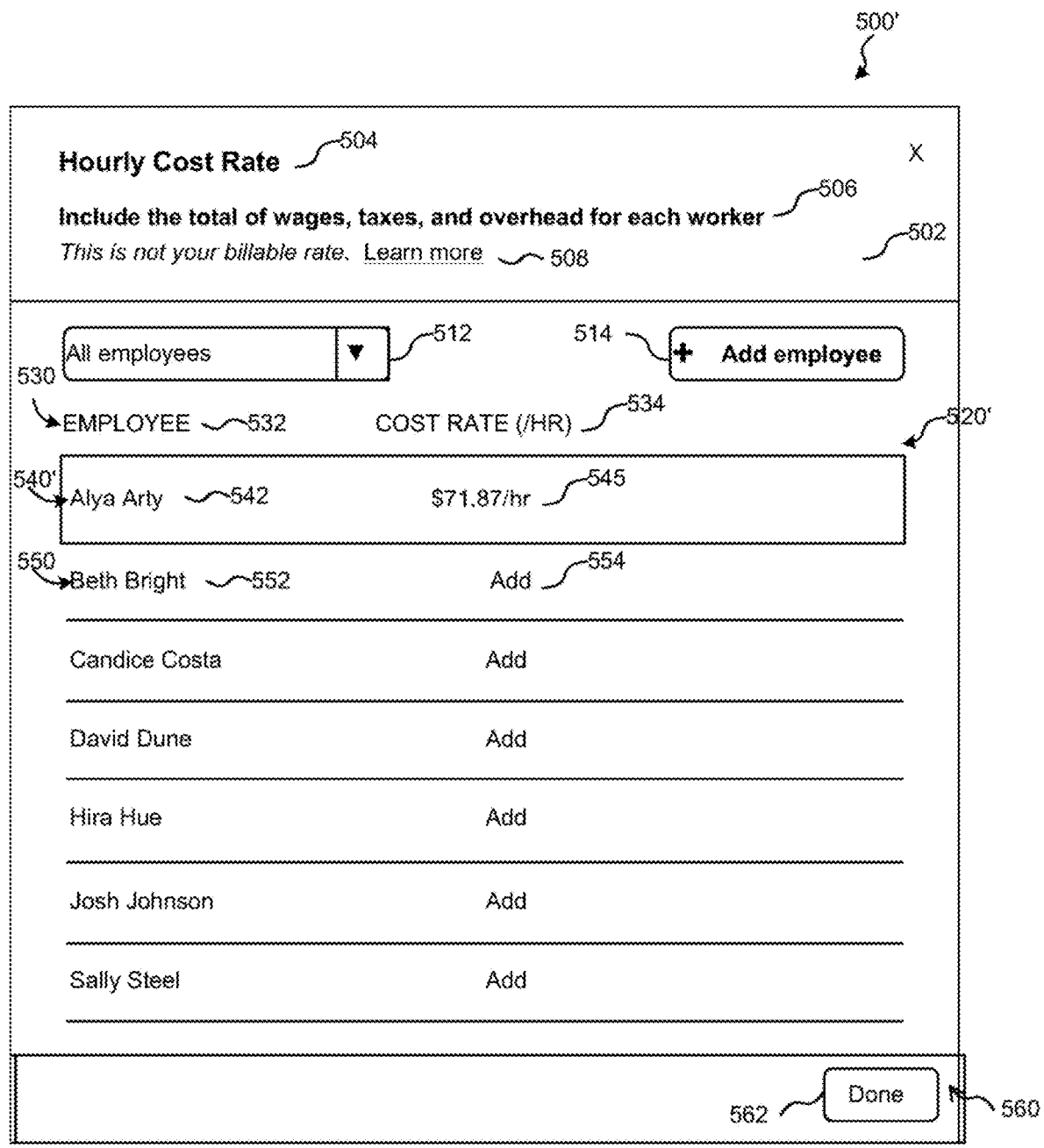
FIG. 8 shows an updated example user interface that may be used in the process for determining an employee's labor cost value according to an embodiment of the present disclosure.

As noted above, upon the completion of the cost calculator process 400, the process 300 may update the main cost rate user interface 500 as shown for example by updated main cost rate user interface 500' in FIG. 8. In the illustrated example, the updated main cost rate user interface 500' includes an updated third region 520' containing an updated second row 540'. The updated second row 540' may still include text field 542 containing employee name "Alya Arty." In the illustrated example, updateable field 544, cost calculator selectable icon 546, cancel selector 547 and save selector 548 are replaced by field 545, which contains the determined hourly cost rate for the employee (e.g., as determined by step 412 of process 400). In the illustrated example, filed 545 contains the rate "$71.87" matching the value shown in field 664 of interface 600.

With reference to FIG. 6, it can be appreciated that the layout of fields 544 and cost calculator selectable icon 546 of main interface 500 provide a unique arrangement not used by traditional calculators. It is unique in the calculator art to display updatable field 544 to the left of calculator icon or a cost calculator selectable icon 546.

Moreover, the use of the cost calculator selectable icon 546 to overlay the hourly cost calculator interface 600 over main interface 500 (and or to present the overlay the hourly cost calculator interface 600 proximate to the main interface 500) provides an enhanced user interface where all user interface elements required to determine an employee's true labor cost rate are displayed in a single screen. This is particularly evident when compared to current spreadsheet programs that are used to determine labor costs. For example, in the few instances where an employer or business owner currently attempts to incorporate hidden employee costs into its profit margin or other analysis, these employers/business owners do so using spreadsheets. To do so, the employer/business owner must determine formulas and input them into cells of the spreadsheet. Moreover, data entry cells needed for the formulas are not associated with graphical icons such as the disclosed cost calculator selectable icon 546. Furthermore, the spreadsheet technique does not overlay an hourly cost calculator interface 600 that may contain a graphical symbol 606 making it appear that the hourly cost calculator interface 600 originated from and popped out of an existing interface in a single screen view. Thus, current employers/business owners may need to switch between pages/tabs of the spreadsheet program and or may need to scroll through several screens to execute and or view the calculations—this is undesirable. Accordingly, current employers/business owners are not provided with an interactive and graphical user interface that provides all necessary interfaces in one screen and with a limited and or specific amount of data such as the interfaces provided by the disclosed principles.

With reference to FIG. 7, it should be appreciated that the disclosed principles are not limited to the order of rows 610-670, text used in the fields 612-662, or the type of data input or displayed in fields 614-664 (integer, floating point). In addition, it should be understood that while fields 614-664 are shown on the right of text fields 612-662, the arrangement of these user interface elements could be reversed if desired. In one or more embodiments, some data entries are optional (e.g., the data associated with rows 630, 640, 650). It should be appreciated, however, that use of the optional data may provide a better estimate of the employee's true labor cost.

In one or more embodiments, the employee's determined hourly cost rate may be used in conjunction with the employee's projected or actual time spent on projects to forecast profitability of past, current and or future projects. In addition, once an employee's labor cost is determined for one project, it may be used by business owners to track or predict profitability and performance on any given project and use that cost for other business expenditures. Thus, for any given project, users of the disclosed system are clearly able to view in a visual manner (via the disclosed human machine interface) how much a project cost them—this way they may be able to understand where their money is being spent and when, compared to the revenue for each project, to get a clear profit margin so that in the future they can estimate profitability better.

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. For example, other steps may be provided, or steps may be eliminated, from the described flows, and other components may be added to, or removed from, the described systems. Accordingly, other implementations are within the scope of the following claims.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

What is claimed is:

1. A computer implemented method comprising:
    outputting a first graphical user interface to a display of a computing device, the first graphical user interface comprising:
        a first field identifying an employee,
        a selector for causing the display of a second field, wherein the second field is for selecting a cost calculator process for the employee identified in the first field, and
        a third field for displaying a calculated labor cost value for the employee identified in the first field;
    receiving an input of a selection of the selector;
    in response to receiving the selection of the selector, causing the second field to be displayed on the first graphical user interface to replace the selector on the first graphical user interface;
    receiving an input of a selection of the second field;
    outputting a second graphical user interface to the display in response to inputting the selection of the second field, the second graphical user interface being proximate to the first user interface and in a same screen view of the display, the second user interface comprising:
        a first region for displaying a wage value for the employee,
        a second region for displaying at least one employer cost value attributable to employee, and
        a third region for displaying the calculated labor cost value for the employee;
    receiving an input to the wage value;
    receiving an input to the at least one employer cost value;
    determining the calculated labor cost value based on the wage value and the at least one employer cost, and
    causing the calculated labor cost value to be displayed in the third field on the first graphical user interface to replace the second field.

2. The method of claim 1, further comprising displaying a graphical symbol connecting the second field to the second user interface.

3. The method of claim 1, further comprising outputting an animation of the second user interface as arising from the second field upon selection of the second field.

4. The method of claim 1, wherein the second field includes a selectable calculator icon.

5. The method of claim 4, further comprising removing the second field and adding the third field after the calculated labor cost value is determined.

6. The method of claim 1, wherein the at least one employer cost value comprises one or more of a Federal Insurance Contributions Act (FICA) tax value, an employer tax value, a workers compensation value, or an overhead value and the at least one second region comprises a respective sub-region for displaying the one or more of the FICA tax value, employer tax value, workers compensation value, or overhead value.

7. The method of claim 1, wherein the calculated labor cost value is determined by adding the wage value and the at least one employer cost value.

8. The method of claim 1, wherein the calculated labor cost value is an hourly rate and the method comprises displaying the calculated labor cost value in the third region and third field as an hourly rate.

9. The method of claim 1, wherein the input wage value is received automatically from a payroll service.

10. The method of claim 1, wherein at least one value of the at least one employer cost value attributable to employee is calculated automatically based on the input wage value.

11. A system of one or more processors configured to present a graphical user interface for determining a labor cost value of an employee, said graphical user interface comprising:
   a first graphical user interface comprising:
      a first field identifying an employee,
      a selector for causing the display of a second field, wherein the second field is for selecting a cost calculator process for the employee identified in the first field, wherein the second field is displayed on the first graphical user interface in response to receiving an input of a selection of the selector and the second field replaces the selector on the first graphical user interface; and
      a third field for displaying a calculated labor cost value for the employee identified in the first field; and
   a second graphical user interface, presented on the display in response to the processor inputting a selection of the second field, the second graphical user interface being provided proximate to the first user interface and in a same screen view of the display, the second user interface comprising:
      a first region for displaying a wage value for the employee,
      a second region for displaying at least one employer cost value attributable to employee, and
      a third region for displaying the calculated labor cost value for the employee, wherein the calculated labor cost value from the second graphical user interface is displayed in the third field and replaces the second field on the first graphical user interface.

12. The graphical user interface of claim 11, wherein the second user interface comprises a graphical symbol connecting the second field to the second user interface.

13. The graphical user interface of claim 11, wherein the second user interface comprises an animation of the second user interface as arising from the second field upon selection of the second field.

14. The graphical user interface of claim 11, wherein the second field includes a selectable calculator icon.

15. The graphical user interface of claim 11, wherein the at least one employer cost value comprises one or more of a Federal Insurance Contributions Act (FICA) tax value, an employer tax value, a workers compensation value, or an overhead value and the at least one second region comprises a respective sub-region for displaying the one or more of the FICA tax value, employer tax value, workers compensation value, or overhead value.

16. The graphical user interface of claim 11, wherein the processor receives the input wage value automatically from a payroll service.

17. The graphical user interface of claim 11, wherein at least one value of the at least one employer cost value attributable to employee is calculated automatically based on the input wage value.

* * * * *